July 19, 1932. G. T. MALLETT 1,867,855
STEREOSCOPIC CINEMATOGRAPHY
Filed April 24, 1930 3 Sheets-Sheet 2

INVENTOR:
George T. Mallett,
BY
Byrne, Townsend & Potter
ATTORNEYS.

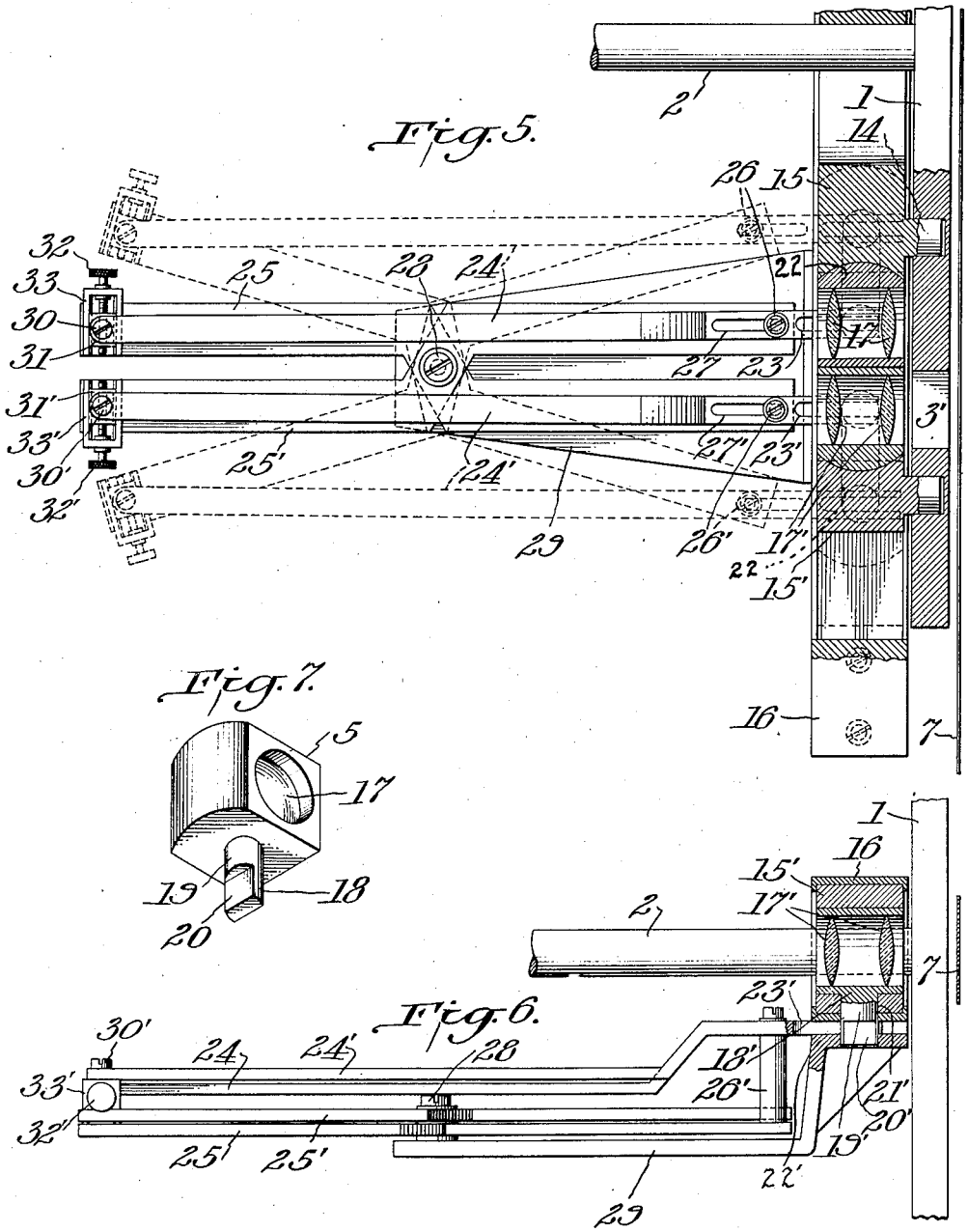

Patented July 19, 1932

1,867,855

UNITED STATES PATENT OFFICE

GEORGE T. MALLETT, OF ELIZABETH, NEW JERSEY

STEREOSCOPIC CINEMATOGRAPHY

Application filed April 24, 1930. Serial No. 447,054.

This invention relates to a method and apparatus for the cinematographic reproduction of scenes.

The invention has for its primary object the reproduction of scenes with a simulation of the natural stereoscopic effect of ordinary vision.

A further object of the invention is the provision of means for the production of a continuous series of substantially stereoscopic pairs of images.

Briefly stated, the method comprises the taking by alternate exposure of substantially stereoscopic images on a continuously moving film, and the simulation of stereoscopic projection of said images in a continuous manner, the taking and the projection of the resulting pairs of images being effected on converging horizontal angles analogous to the angles of natural stereoscopic vision.

The apparatus of the invention comprises means for continuously horizontally displacing a film, means adapted to expose alternate predetermined portions of said film throughout an exposure period, a pair of lens systems and means for reciprocally altering the angles of said lens systems in synchronism with the displacement of said film so that the portion of the film being exposed is continuously maintained in focus upon a predetermined fixed point.

The invention will be described, for the purpose of illustration, with reference to the accompanying drawings representing apparatus adapted for use in both the taking and the projection of images in accordance with the invention. The invention will be described more particularly with reference to the projection of images; and the application of the invention to the taking of images will, it is believed, be clearly apparent from such description.

In the drawings:

Fig. 5 is an enlarged detail plan view, in partial section, of the lens controlling mechanism;

Fig. 6 is a side elevation, in partial section, of the parts shown in Fig. 5; and Fig. 7 is a perspective view of a lens holder.

In the drawings like reference characters denote the same elements in all of the figures.

Figure 1:
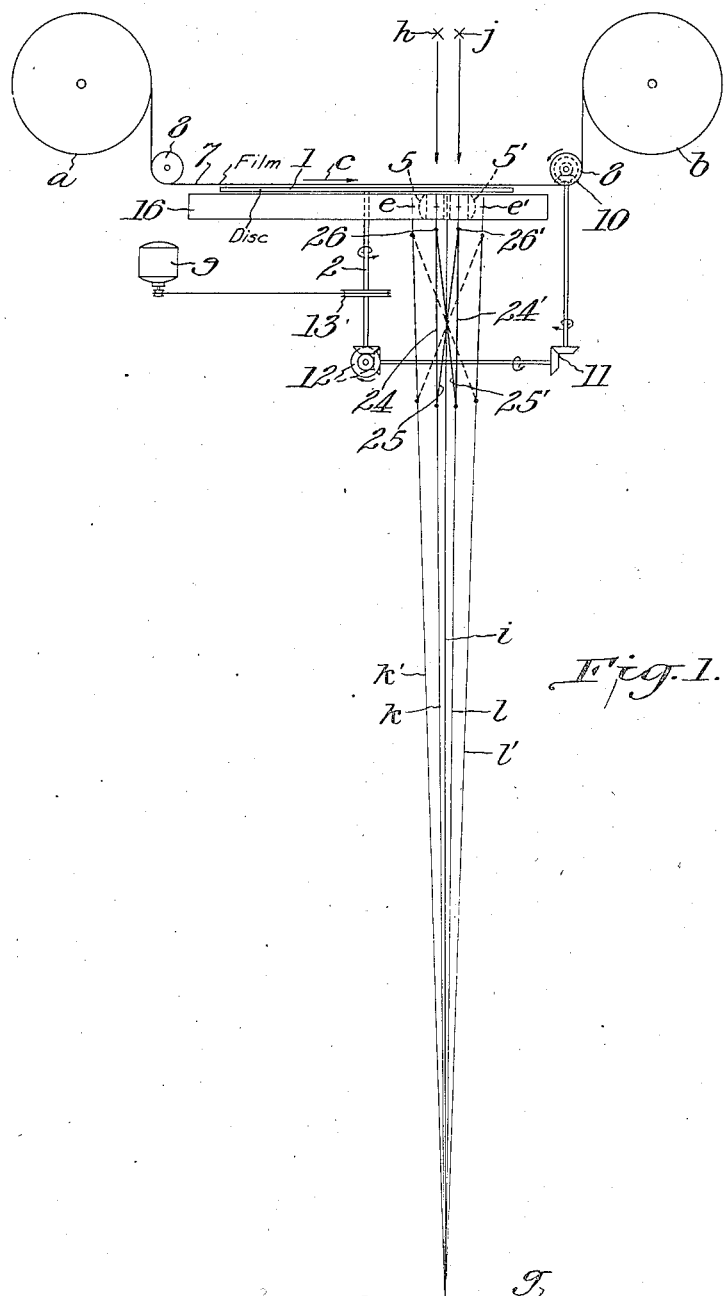
Fig. 1 is a diagrammatic plan view of a system of projection in accordance with the invention.
Figure 2:
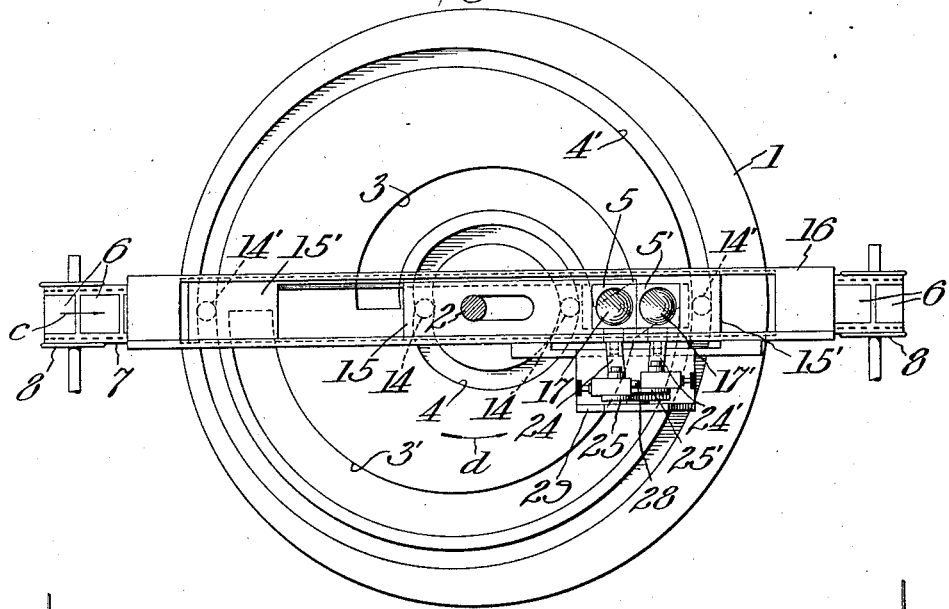
Fig. 2 is an elevation of the mechanism for synchronously exposing the film and altering the angles of the lenses.
Figure 3:
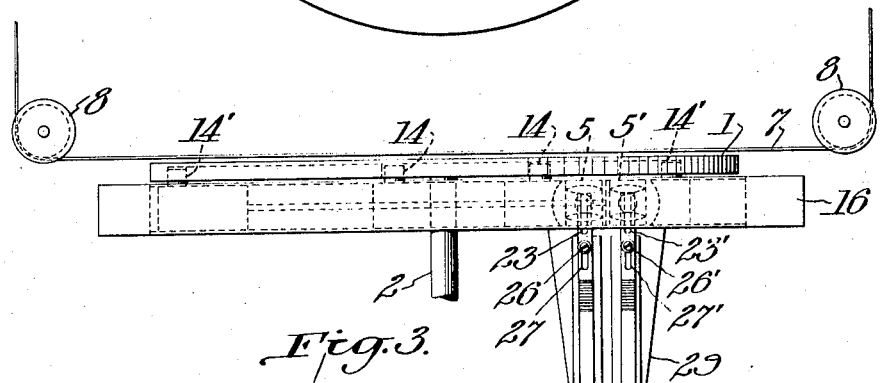
Fig. 3 is a plan view of the mechanism of Fig. 2.

Referring particularly to Figs. 2 and 3, 1 is a rotatable shutter disc, mounted on and rotatable with a horizontal drive shaft 2. The shutter disc is pierced by spiral shutter slots 3 and 3' and carries eccentric camways 4 and 4', corresponding to lens holders 5 and 5', respectively.

The radial opening of shutter slots 3 and 3' corresponds to the width of the individual images 6 covering predetermined portions on the film 7 and the drive shaft 2 of the shutter disc and the means for advancing the film, such as one of the toothed spools or sprocket rollers 8, are so geared to the common driving means, such as a motor 9, Fig. 1, that the linear velocity of the film is the same as the velocity of radial displacement of the spiral shutter slots. This gearing may take the form illustrated at 10, 11, 12 and 13, Fig. 1.

Figure 4:
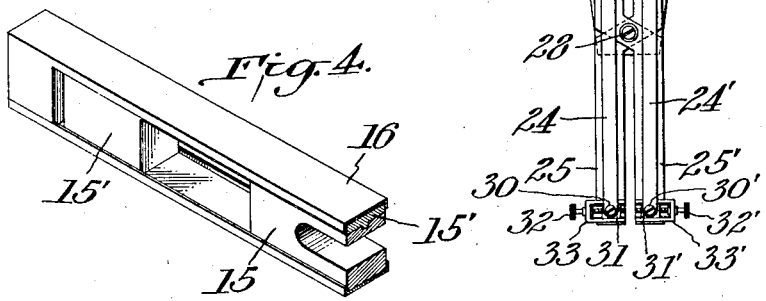
Fig. 4 is a fragmentary perspective view of the slideways for the lens holders.

The camways 4 and 4' engage complemental means such as the pins 14 and 14' projecting from the lens holder slide blocks 15 and 15', and coact with said pins and slide blocks to reciprocate the lens holders 5 and 5' back and forth in frame 16, which provides a slideway for the blocks; the lens holders when moving in the direction of motion of the film being aligned with, and in synchronous motion with, the corresponding spiral shutter slots 3 and 3'. The relation and mode of operation of the slide blocks 15 and 15' will be more apparent from Fig. 4 where it will be seen that slide 15 carrying lens holder 5 reciprocates inside of slide 15' carrying lens holder 5' and that the latter slide reciprocates in the frame 16.

I will now describe the mechanism for maintaining the objectives in optical convergence upon a predetermined fixed point. The mechanism is shown in detail in Figs. 5, 6 and 7.

The objective lenses 17 and 17' are carried in the lens holders 5 and 5', respectively, one of which is shown in detail in Fig. 7. Projecting from the bottom of the lens holders 5 and 5' are trunnions 18 and 18', respectively, each of the same having an upper round section 19 and 19' and a lower flat section 20 and 20', respectively. The upper round section of each of the trunnions engages a corresponding bearing hole 21 and 21' in its respective slide block 15 and 15', and passes through a complemental slot 22 and 22' in the bottom of the slide frame 16. The lower flat portions 20 and 20' engage the forked ends 23 and 23' of link members or arms 24 and 24'. These arms 24 and 24' are pivoted at their outer ends to the outer ends of lever members 25 and 25'. Lever members 25 and 25' engage at their inner ends, by means of posts 26 and 26', slots 27 and 27' at the inner ends of arms 24 and 24', respectively, the post 26 being carried by arm 25' and the post 26' by arm 25. These lever members 25 and 25' cross and are pivoted together by a pivot member 28 carried by a bracket 29 fixed to slide frame 16. This pivotal point of the lever members is so arranged relatively to their longitudinal centers that when the lever members are spread apart in response to movement of the holders 5 and 5' their forked ends will be separated more widely than their free ends. Furthermore, the length and pivotal points of the arms and lever members are so relatively adjusted that they coact through the engagement of the forked ends 23 and 23' of arms 24 and 24' with the flat sections 20 and 20' of the trunnions 18 and 18', to maintain the objectives carried in lens holders 5 and 5' in optical convergence upon a predetermined fixed point. The cam slots 4 and 4' merely move the lens holders 5 and 5' laterally, the constant convergence of the axes of the two lens systems being provided for by the arm and lever arrangement which is operated by the lateral movement of the holders and reacts upon them through the forked ends 23 and 23' of the arms and the flat portions 20 and 20' of their trunnions to vary their angles of projection.

Any appropriate means for adjusting the focus of the objectives by moving the outer ends of the arms 24 and 24' relatively to the outer ends of the lever members 25 and 25', respectively, may be provided. As one embodiment of such means, I have shown the ends of the arms 24 and 24' pivoted at 30 and 30', respectively, to nuts 31 and 31' transversely adjustable by manually operable screws 32 and 32' in guides or slideways 33 and 33' fixed to the ends of the link members 25 and 25', respectively.

It will be seen that when taking pictures by the method of the invention, the consecutive images will be alternately left and right substantial stereo-images, and that the images will be positioned on the film in the order "two", "one", "four", "three", and so on, and that when projecting the scene the alternate left and right images will be projected in the order "one", "two", "three", "four", and so on, as taken. The reason for this will be apparent from the later description of the operation of the apparatus.

It will also be seen that the images are both taken and projected upon substantially the normal horizontal angles of natural stereoscopic vision in a continuous manner, so that the resulting projected scene reproduces the natural appearance of the original with a fidelity as to depth and distance effects hitherto unobtained in the motion picture art.

The operation of the invention, particularly in the projection of images by means of the apparatus shown and described, is substantially as follows, reference being had especially to the diagrammatic showing of Fig. 1.

Assume that the picture strip or film 7 is unwound from the reel $a$ onto the reel $b$, and is thus moved in the direction of the arrow $c$, Figs. 1 and 2, under the influence of the motor 9 and gearing 10, 11, 12 and 13, and that the shutter disc 1 turns counterclockwise, as indicated by the arrow $d$, Fig. 2, and that the lens holders 5 and 5' are at the limits of their separation, as indicated at $e$ and $e'$, Fig. 1, and in broken lines, Fig. 5, and $f$ represents the fixed point on the screen $g$ on which the converging horizontal angles of the objectives focus. It will be obvious that, as the film 7 with its individual images 6 progresses in the direction of the arrow $c$, the objective 5 will be the first encountered by these images, and in order to project the images in proper, continuous, alternate sequence it is necessary, before starting projection upon the screen, to so arrange the film that the image "two", which precedes the image "one", thereon, will lie in the blank space between the two objectives 5 and 5' thus positioning the image "one" adjacent to the objective 5 in readiness to be projected by the ray from light source $h$ as the shutter slot 3 uncovers the objective 5 and is displaced laterally with such objective in synchronism with the travel of the film.

Of course, as the objective 5 is displaced toward the medial line or axis $i$, Fig. 1, the objective 5' is synchronously displaced toward such line $i$ also but is blocked against passage of light through it from source $j$ by the shutter disc 1. However, when projection of image "one" through slot 3 and objective 5 is completed, and slot 3' begins to register with objective 5' image "two" will be in position to be projected due to the synchronism of movement of the film 7, shutter disc 1 and objective 5'.

Thus, although the images appear in sequence upon the film in the order "two", "one", "four", "three", and so on, they will be projected in the order "one", "two", "three", "four", and so on, as taken.

As hereinbefore explained, the partial rotation of the objectives 5 and 5' by means of their connection with the arm and lever mechanism 24, 24', 25, 25' will maintain them, throughout their lateral horizontal displacement, focused upon the point $f$, as indicated by the lines $k$, $k'$ and $l$, $l'$ (Fig. 1) illustrating the extremes of such displacement, and thus, although the film 7 travels continuously, as distinguished from the customary intermittent travel of such films, the images will be projected without apparent interruption and in proper sequence upon the same point or, in other words, within the same "frame" upon the screen.

Moreover, as one image is blocked against projection, its normally sequential image is projected, and as the human eye is incapable of refocusing in the time interval between the projection of these two images, the impression on the eye of one image is augmented by the succeeding image, and the stereoscopic effect is produced upon the observer.

Of course, if desired, the direction of rotation of the shutter disc 1 may be clockwise rather than counterclockwise, as described, and in such case the direction of travel of the film will be in the opposite direction from that indicated by the arrow $c$.

It will be obvious that the invention is not limited to the embodiment specifically described for purposes of illustration, but that it broadly comprises a method and apparatus for simulated stereoscopic cinematography whereby a series of images from alternate left and right horizontal angles may be photographically reproduced upon a continuously moving film and whereby the left and right images may be successively projected through substantially the same horizontal angles as those from which they were taken.

I claim:

1. Apparatus for simulated stereoscopic cinematography, comprising means for continuously horizontally displacing a film, a shutter adapted to expose alternate predetermined portions of said film throughout an entire exposure period, a pair of objectives, and means operatively connected with the means for displacing the film and actuating the shutter for maintaining said objectives alternately in optical alignment with the portion of the film being exposed and continuously in optical convergence upon a predetermined fixed point.

2. Apparatus for simulated stereoscopic cinematography, comprising means for continuously horizontally displacing a film, a rotatable shutter having two spiral slots in opposite half-segments thereof and adapted to expose alternate predetermined portions of said film, means for rotating said shutter in synchronous relationship to the displacement of said film, a pair of objectives, and means operatively connected with said means for displacing the film and rotating the shutter for displacing the angular position of said objectives so that said objectives are alternately brought into optical alignment with the portion of the film being exposed by the shutter and are continuously maintained in optical convergence upon a predetermined fixed point.

3. Apparatus for simulated stereoscopic cinematography, comprising means for continuously horizontally displacing a film, a shutter adapted to expose alternate predetermined portions of said film throughout an entire exposure period, a pair of objectives, and means operatively connected with the means for displacing the film and actuating the shutter for reciprocating said objectives alternately in a horizontal plane in optical alignment with the alternately exposed portions of the film and for continuously altering the angular position of said objectives so as to maintain the objectives in optical convergence upon a predetermined fixed point.

4. Apparatus for simulated stereoscopic cinematography, comprising means for continuously horizontally displacing a film, a shutter adapted to expose alternate predetermined portions of said film throughout an entire exposure period, a pair of objectives mounted in holders, means for alternately reciprocating said holders in a horizontal plane synchronously with the motion of the film and the shutter, and means for rotating said holders in a horizontal plane to maintain the objectives in optical convergence upon a predetermined fixed point.

5. Apparatus for simulated stereoscopic cinematography, comprising means for continuously horizontally displacing a film, a shutter adapted to expose alternate predetermined portions of said film throughout an entire exposure period, a pair of objectives mounted in holders, means for alternately reciprocating said holders in a horizontal plane synchronously with the motion of the film and the shutter, and means actuated by the reciprocal motion of said holders for rotating said holders in a horizontal plane to maintain the objectives in optical convergence upon a predetermined fixed point.

6. Apparatus for simulated stereoscopic cinematography, comprising means for continuously horizontally displacing a film, a rotatable shutter having two spiral slots in opposite half-segments thereof and adapted to expose alternate predetermined portions of said film, means for rotating said shutter in synchronous relationship to the displacement of said film, a pair of objective holders carrying paired objectives, said holders being pivotally mounted in horizontally displaceable members, means for alternately reciprocating said members in a horizontal plane synchronously with the motion of the film and the shutter, and means actuated by the reciprocal motion of said members for rotating said holders in a horizontal plane to maintain the objectives in optical convergence upon a predetermined fixed point.

7. Apparatus for simulated stereoscopic cinematography, comprising means for continuously horizontally displacing a film, a rotatable shutter having two spiral slots in opposite half-segments thereof and adapted to expose alternate predetermined portions of said film, means for rotating said shutter in synchronous relationship to the displacement of said film, a pair of objective holders carrying paired objectives, said holders being pivotally mounted in horizontally displaceable members, and a pair of cam elements, said elements cooperating with complemental elements carried by said displaceable members to effect the reciprocation of said members in a horizontal plane synchronously with the motion of the film and the shutter.

8. Apparatus for simulated stereoscopic cinematography, comprising means for continuously horizontally displacing a film, a rotatable shutter having two spiral slots in opposite half-segments thereof and adapted to expose alternate predetermined portions of said film, means for rotating said shutter in synchronous relationship to the displacement of said film, a pair of objective holders carrying paired objectives, said holders being pivotally mounted in horizontally displaceable members, a pair of cam grooves in said shutter, said grooves cooperating with complemental means carried by said displaceable members to effect the reciprocation of said members in a horizontal plane synchronously with the motion of the film and the shutter.

9. Apparatus for simulated stereoscopic cinematography, comprising means for continuously horizontally displacing a film, a shutter adapted to expose alternate predetermined portions of said film throughout an entire exposure period, a pair of objectives mounted in holders, means for alternately reciprocating said holders in a horizontal plane synchronously with the motion of the film and the shutter, arms having one end in operative engagement with said holders and lever members connected with said arms and interconnecting both of said arms and coacting therewith to rotate said holders in a horizontal plane during said reciprocating motion so as to maintain the objectives in optical convergence upon a predetermined fixed point.

10. Apparatus for simulated stereoscopic cinematography, comprising means for continuously horizontally displacing a film, a shutter adapted to expose alternate predetermined portions of said film throughout an entire exposure period, a pair of objectives mounted in holders, means for alternately reciprocating said holders in a horizontal plane synchronously with the motion of the film and the shutter, arms having one end in operative engagement with said holders, lever members connected with said arms and interconnecting both of said arms and coacting therewith to rotate said holders in a horizontal plane during said reciprocating motion so as to maintain the objectives in optical convergence upon a predetermined fixed point, and means for adjusting said arms relatively to said lever members whereby preliminary focusing of said objectives upon said point may be accomplished.

11. A method of simulated sterescopic cinematography which comprises photographically producing a series of images alternately from left and right varying horizontal angles upon a continuously moving film, and projecting the left and right images thus produced successively during continuous travel of the film through substantially the same varying horizontal angles as those from which they were taken.

12. A method of simulated stereoscopic cinematography which comprises photographically producing a series of images alternately from left and right varying horizontal angles substantially corresponding to the natural angles of stereoscopic vision upon a continuously moving film, and projecting the left and right images thus produced successively during continuous travel of the film through substantially the same varying horizontal angles as those from which they were taken.

In testimony whereof, I affix my signature.

GEORGE T. MALLETT.